Dec. 20, 1966   A. RUMBERG ETAL   3,293,346
HEAT INSULATING CEILING FOR ELECTROTHERMAL-FURNACES
Filed Dec. 10, 1963   4 Sheets-Sheet 1
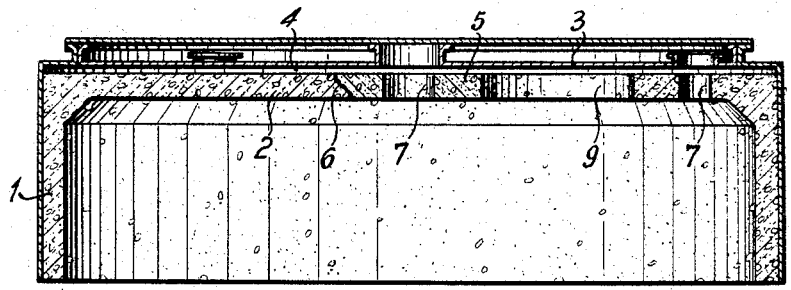
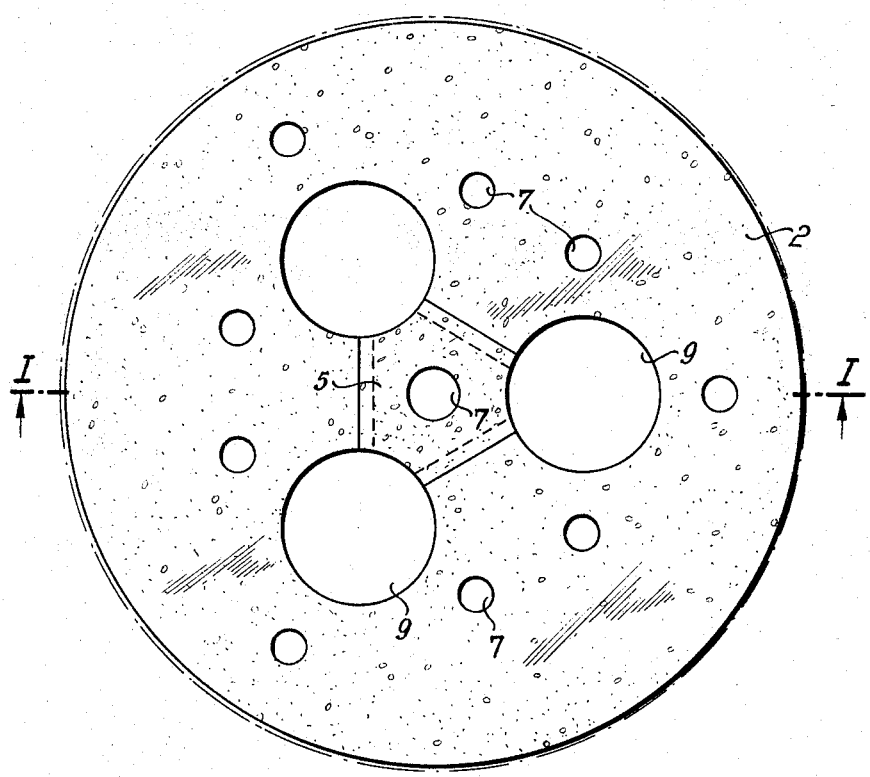

United States Patent Office 3,293,346
Patented Dec. 20, 1966

3,293,346
HEAT INSULATING CEILING FOR ELECTROTHERMAL-FURNACES
Alfred Rumberg, Hermulheim, near Cologne, Alfred Schöll, Cologne-Klettenberg, Kurt Zager, Junkersdorf, near Cologne, Wilhelm Dämgen, Alstadten, near Cologne, Alfred Kronberg, Hermulheim, near Cologne, and Eberhard Müller, Kleinbullesheim, near Euskirchen, Germany, assignors to Knapsack Aktiengesellschaft, a corporation of Germany
Filed Dec. 10, 1963, Ser. No. 329,531
Claims priority, application Germany, Dec. 31, 1962,
K 48,614
7 Claims. (Cl. 13—9)

The present invention provides a heat insulating ceiling protecting the covers in large electrothermal furnaces against the action of heat. The heat insulating ceiling is especialy suitable for use in furnaces for phosphate reduction or calcium carbide production.

German Patent No. 1,143,186 describes a cover for large electrothermal furnaces. The cover is composed of cover segments provided with a heat insulation which are interconnected and connected to the rim of the furnace jacket in gastight manner and allotted to the individual furnace phases. Each cover segment comprises an annular supporting means suspended from a stationary structural part not belonging to the furnace itself and elastically formable cover sheets. Heat insulation is achieved by providing heat removing means which include cooling water channels disposed on the surface area of the cover sheets and, alternatively, water-fed cooling coils enveloped by a heat-resistant insulation disposed underneath the cover sheets.

The present invention provides a heat insulating ceiling inserted below the cover in large electrothermal furnaces of the type described in the above patent and protecting the cover against the action of heat, wherein heat insulation is advantageously ensured by heat damming rather than by removal thereof.

The heat insulating ceiling of this invention is a self-supporting ceiling in concrete inserted below and spaced from the individual cover forming cover segments and comprises a hollow-cylindrical rim section resting on the upper rim of the furnace trough and the actual ceiling portion which may be reinforced with anti-magnetic steel and is provided with ducts receiving the electrodes, feed pipes and gas outlet pipes.

In one embodiment of the present invention, the central portion of the actual ceiling is provided with an aperture extended from electrode duct to electrode duct, the aperture being covered with a crossing made of the same material as the ceiling itself and loosely seated in grooves.

In another embodiment of the present invention, the central portion of the actual ceiling is provided with slotted apertures. These apertures, which are covered with plates of asbestos as top cover plates, are enlarged downwardly and extend radially from the central axis of the heat insulating ceiling, each slotted aperture being situated on the line communicating between the said central axis of the heat insulating ceiling and the central axis of the electrode ducts.

In either of the embodiments described above, the actual ceiling is reinforced with antimagnetic material embedded therein.

In a further embodiment of the present invention, the heat insulating ceiling comprises various sectors, each sector being allotted to an electrode, a centrally arranged crossing having a built-in water-cooled star of antimagnetic material, and preburnt, refractory shaped bricks domed around the electrode ducts.

In a still further embodiment of the present invention, the top edge portion of the hollow-cylindrical rim portion is drawn inwardly, provided with ducts receiving the gas outlet pipe, a bracket or cantilever allotted to each electrode and provided with grooves, to which covering parts comprising two or more subparts and having ducts receiving the electrodes and feed pipes and a crossing common to all covering parts are loosely secured.

Alumina cement admixed with preburnt and crushed firebricks is advantageously used for shaping the individual parts of the heat insulating ceiling in situ, i.e. in the furnace, which are reinforced with antimagnetic hollow steel profiles through which water can be caused to travel.

The various modes of executing the heat insulating ceiling of this invention are shown diagrammatically and partially in section in the accompying drawings in which:

FIG. 1 represents a cross-sectional view of one mode of executing the heat insulating ceiling and of the cover segments spaced from and disposed above the ceiling;

FIG. 2 represents a top plan view of the heat insulating ceiling of FIG. 1;

Figure 3:
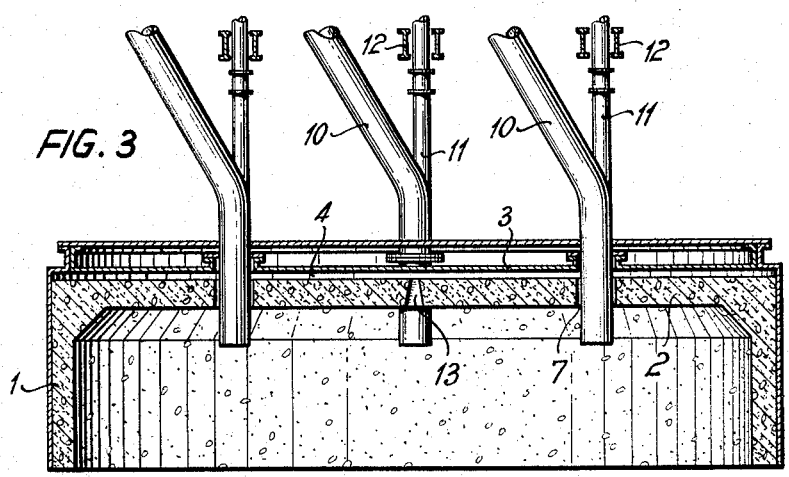
FIG. 3 represents a cross-sectional view of another mode of executing the heat insulating ceiling and of the cover segments and feed pipes disposed thereabove.

In all figures of the accompanying drawings, the heat insulating ceiling of this invention is represented to serve for three-phase electrode arrangement. The cross-section is circular. The heat insulating ceiling comprising the same features may, however, also be designed for other electrode arrangement, for example, for single phase or diphase operation. Furthermore, the heat insulating ceiling need not necessarily have a circular cross-section. It may also be designed as a polygon.

In the embodiment represented in FIGS. 1 and 2, the numeral 1 designates the hollow-cylindrical rim portion resting on the rim of the furnace trough, the top edge portion of the rim portion issuing and ending in the substantially horizontally disposed part 2 which is the actual ceiling. The two parts are self-supporting and produce the actual heat damming effect. The heat insulating ceiling is overdomed by cover 3 composed of cover segments and described in German Patent No. 1,143,186, the cover being spaced from the ceiling at distance 4.

Part 2 is provided with ducts 7 receiving the feed pipes and with ducts 9 receiving the electrodes which extend into the furnace chamber. The central portion of the actual heat insulating ceiling 2 is provided with a recess aperture extended from electrode duct to electrode duct and limited by communicattion lines to be drawn from electrode axis to electrode axis. The rims of said aperture have grooves 6 to which the crossing 5 made of the same material as part 2 is loosely secured.

Figure 4:
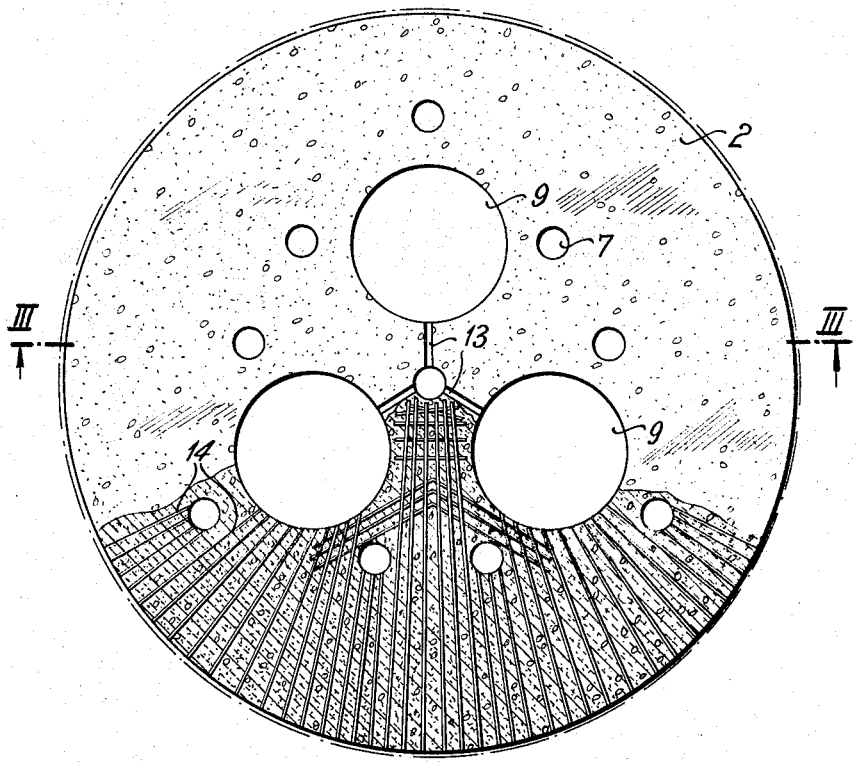
FIG. 4 represents a top plan view of the heat insulating ceiling of FIG. 3 and the layout of the reinforcing material in one sector.

In the heat insulating ceiling represented in FIGS. 3 and 4, the hollow-cylindrical rim portion 1 issues and ends in the substantially horizontally arranged self-supporting part 2 producing the actual heat damming effect. The cover segments forming cover 3 are domed thereabove and spaced from the heat insulating ceiling at distance 4. In a manner analogous to the design of the cover 3, the heat insulating ceiling 2 disposed below and spaced from cover 3 is provided with ducts 7 receiving the feed pipes 10 and with ducts 9 receiving the electrodes. Means 11 serve to suspend the feed pipes 10 which receive the weight of the cover segments from stationary structural parts 12 not belonging to the actual furnace. The center portion of the heat insulating ceiling 2 has slotted recesses 13. These expand downwardly and carry thin plates of asbestos as top cover plates. The slotted recesses 13 are situated in the direction of the straight line connecting the center axes of the electrode ducts and the center axis of the heat insulating ceiling, that is to say, they extend radially.

FIG. 4 exemplifies the layout of the antimagnetic steel 14 used for reinforcing in a sector of a large heat insulating ceiling. Layout and dimensioning of the reinforcement are dictated by the practiced rules of concrete statics.

Figure 5:
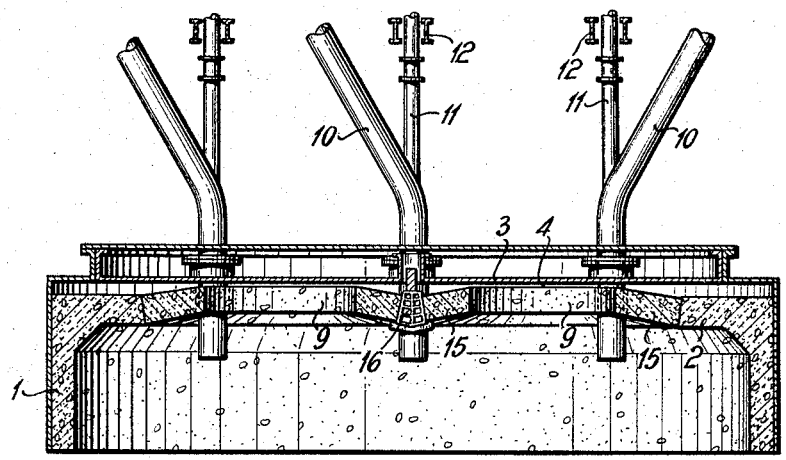
FIG. 5 represents a cross-sectional view of a further mode of executing the heat insulating ceiling and the cover segments and feed pipes disposed thereabove.
Figure 6:
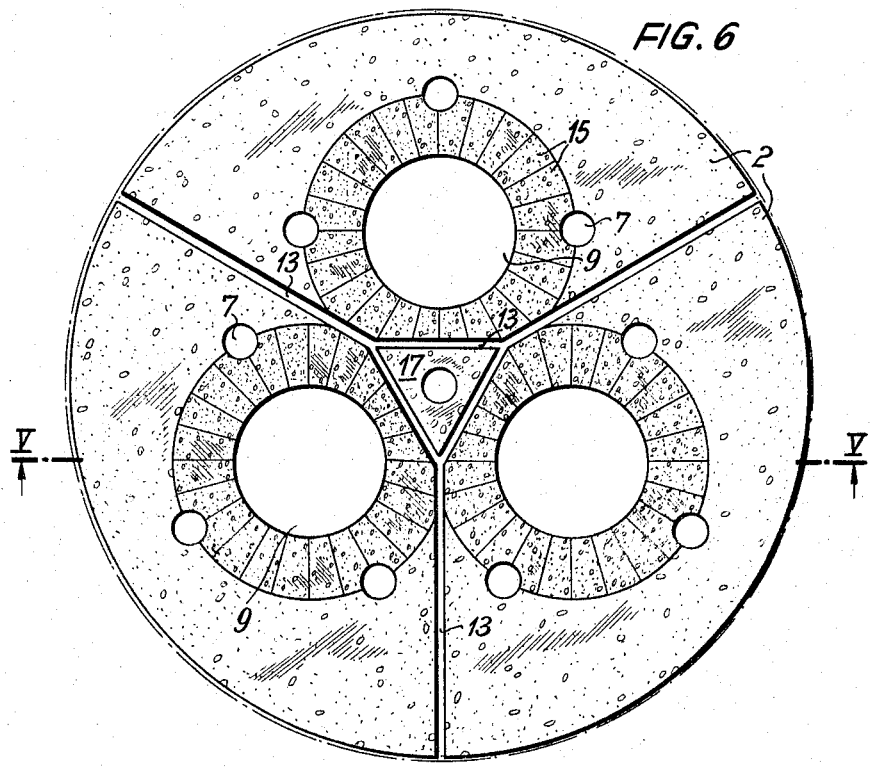
FIG. 6 represents a top plan view of the heat insulating ceiling of FIG. 5.

In the embodiment represented in FIGS. 5 and 6, the heat insulating ceiling designed for three-phase operation is formed by three identical sectors and so is the rim portion 1. The individual sectors are spaced from one another by providing slotted recesses 13 which expand downwardly and carry thin plates of asbestos as top cover plates. In the center portion of the heat insulating ceiling, a crossing 17 with a built-in water-cooled star is provided. In this embodiment, preburnt, refractory shaped bricks 15 free from reinforcing material 16 are domed around each electrode duct.

Figure 7:
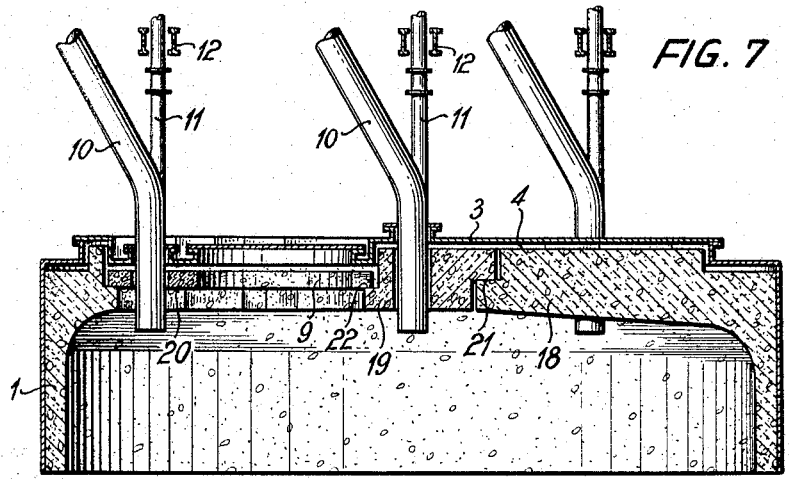
FIG. 7 represents a cross-sectional view of a still further mode of executing the heat insulating ceiling and the cover segments and feed pipes disposed thereabove and FIG. 8 represents a top plan view of the heat insulating ceiling of FIG. 7.
Figure 8:
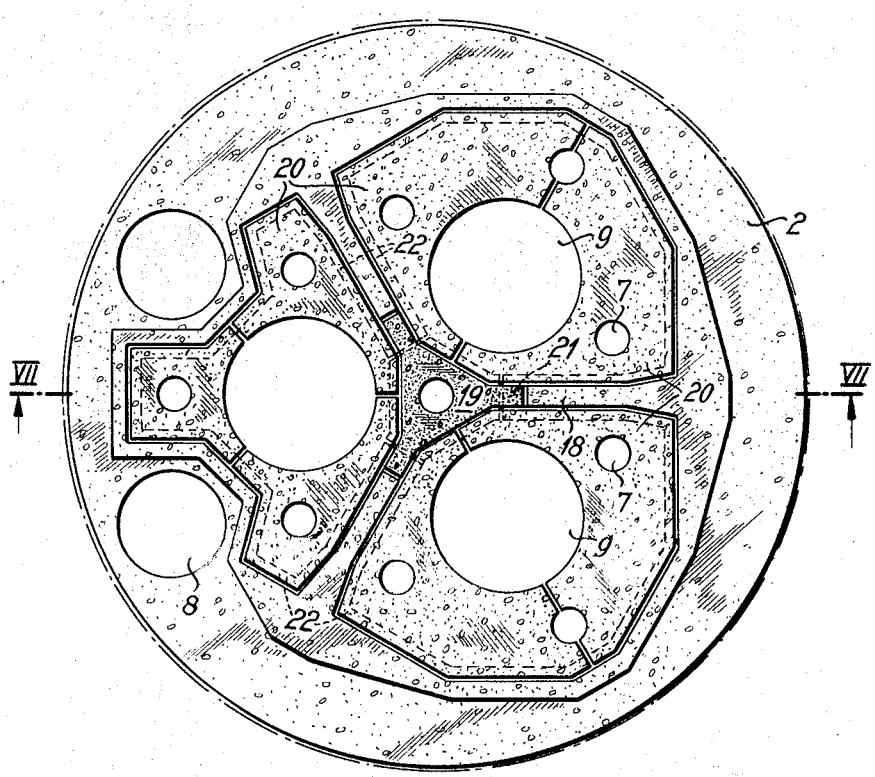

In the embodiment represented in FIGS. 7 and 8, the rim portion 1 of the heat insulating ceiling extends between two electrodes to end in brackets or cantilevers 18 with their front ends being designed as grooves 21 and disposed radially with respect to the heat insulating ceiling. Grooves 22 are disposed alongside the brackets 18 and the rim portion of part 2. The grooves 21 in brackets 18 provide support for a crossing 19. The crossing 19 has corresponding counter-grooves and grooves 22 along its longitudinal sides in a manner analogous to the brackets 18 and the rim portions of part 2.

The plane top cover plates 20 have recesses which are passageways for the ducts receiving the feed pipes and are placed on grooves 22. The cover plates 20 may be shaped to have contours limited by straight and/or curved lines.

The ducts receiving the electrodes are formed on placing the top cover plates 20 with corresponding recesses on the grooves 22. The ducts 8 receiving the gas outlet pipes are recessed in part 2. Thin plates of asbestos serve to cover the joints between the individual plates.

Alumina cement admixed with preburnt and crushed firebricks is the preferred material for making the ceiling parts shaped in situ. The antimagnetic steel reinforcement of the parts shaped in the furnace may be profiled to enable cooling water to flow therethrough.

The heat insulating ceiling producing the heat damming effect and thermal insulation of the cover in large electrothermal furnaces has proved very reliable in practice.

We claim:

1. In a cover for large electrothermal furnaces, said cover being provided with a heat insulating ceiling and being composed of cover segments which are interconnected and connected to the rim portion of the furnace jacket in gastight manner, the improvement which consists in a self-supporting, heat insulating concrete ceiling producing a heat damming effect, the heat insulating ceiling being disposed below and spaced from the said cover-forming cover segments, said ceiling having a center portion and having electrode receiving ducts, the center portion of the heat insulating ceiling having an aperture extended from electrode duct to electrode duct, and the aperture being covered with a loosely secured crossing made of the same material as the heat insulating ceiling.

2. The improvement of claim 1, wherein the center portion of the heat insulating ceiling is provided with slotted recesses, said recesses increasing in cross-sectional area from the top surface of said ceiling downwardly, said recesses being covered with thin plates of asbestos as top cover plates and said recesses extending radially with respect to the center axis of the heat insulating ceiling, each slotted recess being situated on the line connecting the center axis of the heat insulating ceiling and the center axis of the electrode ducts to permit the electrodes to communicate with each other.

3. The improvement of claim 1, wherein the heat insulating ceiling consists of a plurality of sectors, a crossing in said ceiling being centrally disposed with respect to the center axis of said ceiling, said crossing being provided with a built-in water-cooled star of antimagnetic material, and preburnt shaped bricks domed around each electrode duct.

4. The improvement of claim 1, wherein said ceiling includes gas outlet pipe receiving ducts, said ceiling including a substantially horizontal portion, said ceiling including brackets in said horizontal portion, said brackets having grooved edges, cover plates supported on said grooved edges, each of said cover plates being made of at least two parts, electrode ducts and feed pipe ducts being in said cover plates, and a common crossing being loosely secured to said cover plates.

5. In a cover for large electrothermal furnaces, said cover being provided with a heat insulating ceiling and being composed of cover segments which are interconnected and connected to the rim portion of the furnace jacket in gastight manner, the improvement which consists in a self-supporting, heat insulating concrete ceiling producing a heat damming effect, the heat insulating ceiling being disposed below and spaced from the said cover-forming cover segments, the heat insulating ceiling consisting of a hollow-cylindrical rim portion resting on the rim of the furnace trough and of a substantially horizontal ceiling portion, said ceiling having a center portion with a central axis and having electrode receiving ducts each with a center axis, the center portion of the heat insulating ceiling being provided with slotted recesses, said recesses increasing in cross-sectional area from the top surface of said ceiling downwardly, said recesses being covered with thin plates of asbestos as top cover plates, said recesses extending radially with respect to the central axis of the heat insulating ceiling, and each slotted recess being situated on the line connecting the central axis of the heat insulating ceiling and the center axes of the electrode ducts to permit the electrodes to communicate with each other.

6. In a cover for large electrothermal furnaces, said cover being provided with a heat insulating ceiling and being composed of cover segments which are interconnected and connected to the rim portion of the furnace jacket in gastight manner, the improvement which consists in a self-supporting, heat insulating concrete ceiling producing a heat damming effect, the heat insulating ceiling being disposed below and spaced from the said cover-forming cover segments, the heat insulating ceiling consisting of a hollow-cylindrical rim portion resting on the rim of the furnace trough and of a substantially horizontal ceiling portion, the heat insulating ceiling consisting of a plurality of sectors, said ceiling having a center axis and having electrode receiving ducts, a crossing in said ceiling being centrally disposed with respect to the center axis of said ceiling, said crossing being provided with a built-in water-cooled star of antimagnetic material, and preburnt shaped bricks domed around each electrode duct.

7. In a cover for large electrothermal furnaces, said cover being provided with a heat insulating ceiling and being composed of cover segments which are interconnected and connected to the rim portion of the furnace jacket in gastight manner, the improvement which consists in a self-supporting, heat insulating concrete ceiling producing a heat damming effect, the heat insulating ceiling being disposed below and spaced from the said cover-forming cover segments, the heat insulating ceiling consisting of a hollow-cylindrical rim portion resting on the rim of the furnace trough and of a substantially horizontal ceiling portion, the ceiling including gas outlet pipe receiving ducts, said ceiling including brackets in said horizontal portion, said brackets having grooved edges, cover plates supported on said grooved edges, each of said cover plates being made of at least two parts, electrode ducts and feed pipe ducts being in said cover plates, and a common crossing being loosely secured to said cover plates.

References Cited by the Examiner

UNITED STATES PATENTS

| | | |
|---|---|---|
| 2,159,286 | 5/1939 | Moore. |
| 2,343,443 | 3/1944 | Brooke _____ 13—9 |
| 2,761,003 | 8/1956 | Richardson _____ 13—9 |
| 2,932,679 | 4/1960 | Pierce _____ 13—9 |

JOSEPH V. TRUHE, *Primary Examiner.*